Aug. 10, 1948.   A. W. MESTON   2,446,546
PRESSURE RESPONSIVE CONTROLLER DEVICE
Original Filed March 6, 1946
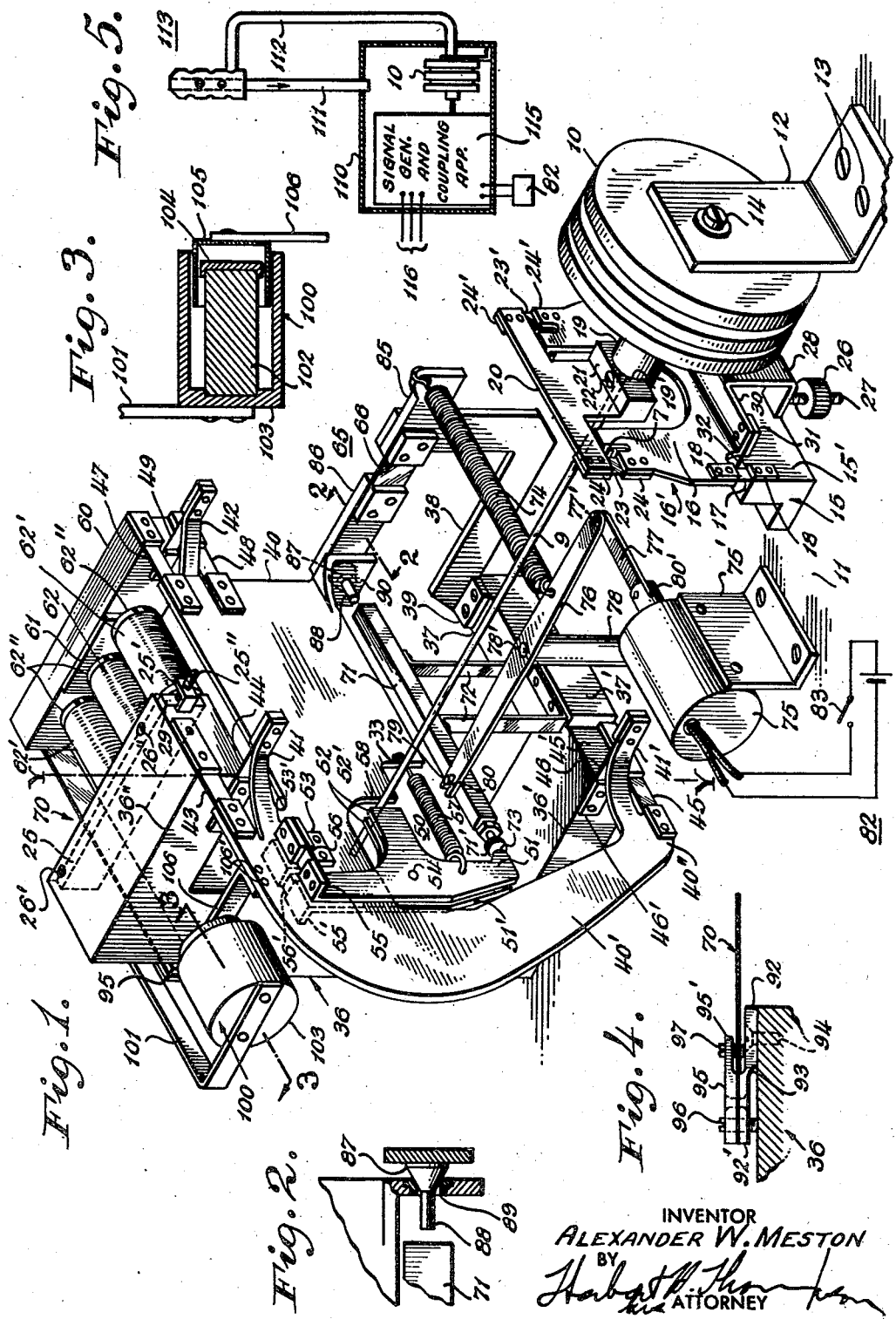
INVENTOR
ALEXANDER W. MESTON
BY
ATTORNEY Patented Aug. 10, 1948

2,446,546

UNITED STATES PATENT OFFICE 2,446,546

PRESSURE RESPONSIVE CONTROLLER DEVICE

Alexander W. Meston, Yonkers, N. Y., assignor to The Sperry Corporation, a corporation of Delaware Continuation of application Serial No. 652,477, March 6, 1946. This application June 10, 1947, Serial No. 753,677

16 Claims. (Cl. 177—380)

This invention relates to a sensitive linkage system for generating a signal output proportional to minute movements of a sensitive controller, such as a barometer, and yet capable of operating over a comparatively wide range of variations in atmospheric pressure such as occur in airplanes.

This application is a continuation of my abandoned prior application Serial No. 652,477 filed March 6, 1946, in the United States Patent Office.

According to my invention, I place between the sensitive pick-off and the device responsive to changes of pressure, such as the bellows of an aneroid barometer, a novel form of multiplying linkage having detachable jaws or clutch means for detachably connecting the barometer and the pick-off under different conditions of expansion. By this means, minute movements within a limited range of the barometer may be multiplied and a signal output proportional to such movement produced with a simple, small signal generator. Obviously, my invention is not limited for use with a sensitive barometer or altimeter as it may also be used with an air speed meter, to give in either case an output of such form that it may be used to actuate a servomotor or similar source of power for use in an automatic pilot for aircraft or in an automatic throttle control.

As shown herein, specifically, my invention is used as a barometric controller for maintaining any desired flight altitude in conjunction with an automatic pilot.

Heretofore barometric control means have included elements such as bearings and pivoted linkages that, in the normal course of operation, have introduced substantial errors into the system. Such losses may arise from the occurrence of so-called "dead spots" on the bearings or from lost motion or other inaccuracies in the mechanical linkages. Since it is necessary to rely on the accurate measurement of extremely small movements of the sensitive element of the pressure responsive devices, it is of utmost importance that sources of friction, lost motion, and other inaccuracies be minimized. Further, in the devices known to the art the extreme delicacy of the linkages mentioned have made the provision of an adjustable altitude datum or reference point, a practical impossibility.

Therefore, a primary object of the invention is to provide means for overcoming the above-mentioned defects of the prior art arrangements.

A feature of this invention is the provision of movable means in pressure-responsive apparatus devoid of bearing friction.

A further feature of this invention is the provision of automatic zeroing or centering means for establishing the proper reference point about which altitude control is to be established.

Another object of this invention is to provide means for eliminating a "jolt" or error signal from the subject instrument when it is put into and out of operation.

Another object of the invention is to provide means for disconnecting the barometric device or expansible bellows from a pick-off device so that in addition to facilitating the proper referencing or zeroing of the subject instrument, the cumulative forces of the bellows exerted on the parts connected thereto is avoided while the instrument-equipped craft travels from the ground or initial datum to the elevation at which altitude control is to take place.

A still further object of this invention is to provide means for automatically damping undesired output signals that may be created in the pick-off device as a result of spurious craft motion.

The invention also relates to the novel features or principles of the instrumentalities described herein, whether or not such are used for the stated objects, or in the stated fields or combinations.

In the drawings,

Fig. 1 is a perspective view of an embodiment of the invention.

Fig. 2 is a detail transverse section view on line 2—2 of Fig. 1, showing the construction of the cone centering elements.

Fig. 3 is a detail longitudinal section view on line 3—3 of Fig. 1, showing the interior construction of the damping device.

Fig. 4 is a detail plan view of the mounting and adjusting means for the rear spring strip mounting for the pick-off armature; and Fig. 5 is a schematic view of another embodiment of the invention incorporating a pressure-responsive device that is responsive to both static and dynamic pressure.

Generally speaking, this invention has created means that may be used in conjunction with an automatic pilot, whereby slight changes in atmospheric pressure, such as result from small changes in altitude, are translated into signals or impulses such as voltage changes. These output voltages or signals are applied in the appropriate sense to the "pitch circuit" of the automatic pilot, such that when, for example, the aircraft drifts below the desired altitude, the elevators are caused to be deflected to cause the aircraft to climb back to the predetermined altitude. The same signal voltages could also be used to vary the power output of the engines in the aircraft and similarly cause the aircraft to climb or descend. Hence, the mentioned means that may be used in conjunction with an automatic pilot provides a means for producing a change in a primary motivation mechanism known as a barometric device in response to a dynamic or static pressure taking device such as a Pitot tube. The resultant device in the first instance is commonly known as a barometric controller and is used in an automatic pilot system such as shown in Fig. 1 of Patent No. 2,358,803 at Hanson et al. In the second or latter instance, the barometric device or expansible container may be characterized somewhat as drawn in application Serial No. 546,868 and specifically as shown in Fig. 5 of the instant application, which incorporates a variation of the primary motivation mechanism 10 in the selected embodiment of the present invention. The pick-off need not be electrical, as it could be a pneumatic pick-off as in the Haglund application Serial No. 602,834. Also the pick-off, when of the electrical type, may use either the principles of magnetic induction or capacitive reactance. It is emphasized that while the structure of Fig. 1 is described in connection with an automatic pilot system for aircraft, the present disclosure is not to be limited thereto, since the inventive concept of employing a frictionless drive in the ordinary sense between a pressure-responsive device and a signal-generating device, known as a pick-off device, may be practiced in mechanism employed in subsurface craft or missiles. In this case, control of the pressure-responsive device would be typified by a particular diaphragm well known in the submarine art, and since the connection between the same and any depth-controlling mechanism is furthermore delineated in many patents related to liquid submersible craft or devices, it is deemed unnecessary to specifically point out how such further utility of the present invention is accomplished. Since the instant invention lies primarily in the use of spring mounting means for all moving parts directly affecting the response of the controller in producing a substantially linear output, it can be appreciated that no specific control system for movable objects in any specific medium should limit the breadth of this concept.

Referring first to Fig. 1, in order to simplify the disclosure of the same, the extremes are described first and the connective elements later along with their respective function with a pressure-responsive device. Thus, a standard temperature compensated barometric device 10 may be supported from its standard shafts 14 and 19 by a bracket 12 fastened to any convenient base 11 by screws 13 and a spring-mounted yoke arrangement 16, respectively. Shaft 19, having a centralized longitudinal bore 19' at its outer end for the reception of a slightly flexible rod element 9, is directly connected to a T-shaped member 20 having a protruding portion 21 at the bottom thereof to receive a centralized screw 22 threaded also into a transverse hole mating with the bore 19' and rod 9 therein. Member 20 has two vertically disposed flexible strips 23 and 23' each depending downwardly from two aligned extremities thereof by block anchoring means 24 and 24', and to the opposite end of each of these strips there is connected the spaced top portions of an intermediate U-shaped member 16' by similar anchoring means 24 and 24'. On the inner top portion of each side of the member 16' are two spaced inwardly flared elements 8 and 8' at right angles to the body of member 16' respectively, and these elements are anchored to member 20 by anchoring means 7 and 7' similar to blocks 24 and 24'. The base of the member 16' is in turn pivoted for movement about a horizontal axis at right angles to shaft 19' by similar spring strips 17 and 17' and anchoring blocks 18 and 18', respectively, the primed block means being hidden on the right by the bellows of the device 10. The blocks 18 and 18' are fastened by common screws or rivets to a fixed L-shaped elongated block 15 which is disposed also at right angles to rod 9 and shaft 19, the uninterrupted vertical face '5' of the block 15 being normally in the same plane as the sides of members 16' and 20 facing device 10. The structure thus far described will permit the movement of the rod element 9 to be substantially aligned with the longitudinal axis of the pressure-responsive device 10 because any tendency of the bellows in device 10 to have unequally distributed tension qualities around its annulus formation will be compensated by the refusal of the described strip springs to be deformed to any considerable degree about their vertical axes. Also, to further overcome the possibility that the upper and lower half sections of the aneroid diaphragms may not respond alike to pressure changes either within or without the aneroid bellows 10 when it is subjected to acceleration forces, a bracket structure 28 integral with a normally horizontally disposed plate 30 flared outwardly from the U-shaped member 16', the bracket depending below the same, is pivotally supported about a horizontal axis by strip springs 32 anchored to the lower part of U-member 16' and the top part of base 15 by anchors 31 and 31', respectively, the strip springs and anchors being similar to those already described. An adjustable nut or weight 26 is hung from the underside of bracket 28 on a stud 27. By turning adjusting nut 26 one way or the other, the weight of the left end of the barometric device 10 can be counterbalanced to care for the mentioned acceleration forces.

The purpose of the above assembly is to act as the source of motivation, a motion input means, or as a first pressure-responsive means for causing signals to be generated in a pick-off device which may be either of the air type found in many of the automatic pilot systems as in Haglund application No. 602,834 or an electric pick-off 62. Pick-off device 62 is substantially conventional in that it is composed of an E-type transformer whose output varies in accordance with the changing positions of an armature 61 mounted on pick-off carrying means including a main lever 40. The distinguishing features of device 62 will be evident from the description of the same hereinafter.

The major portions of the novel apparatus are supported by a U-shaped, light-weight rigid body structure 36 having a bottom portion 36' which is fastened to a base structure 11 and is disposed inwardly toward the aneroid device 10 and in this instance considerably to the right of the aneroid bellows-connected rod 9 and coupling means 21, 22 therefor. Another rigid member 37 is formed integral with portion 36' and at right angles thereto on the right in a horizontal plane. A slight horizontal jog 37' is formed in the region of the above outside junction of sections 36' and 37. A top section 36'' of the U-member 36 tipped on its side 36' mounts the E-transformer to which a movable bar 25 is directly attached for adjustable movement within a grooove 29 on the long left vertical face of section 36'' through a dual threaded set screw 25", the coarse thread going into a threaded end of bar 25, the fine thread going into a threaded hole within an ear 25' integral with the part of section 36" facing the device 10. Exterior set screws 26", 26' on top of element 36" directly over the groove 29 provide means for locking and unlocking the slidable bar 25. Other means of adjustment would serve equally well. Such means of mounting the E-transformer 62' of the pick-off 62 make it possible to adjust the pick-off for zero output under conditions to be explained later.

Between the pick-off device 62 and the pressure-responsive device 10 there are found a plurality of major parts such as pick-off element carrying means including a main lever 40 containing as a part of itself the spring mounting and frictionless pivoting means paired as elements 43, 44 and 45, 46, and as clutch means 50. Other elements essential to the ultimate use of the novel apparatus will be described as they are respectively entered functionally into the combination of mechanisms.

The main lever 40 is a flat rigid vertical plate-like member having an irregular cut-out portion disposed to the left of the pivot means on the bottom side of the member and of sufficient dimensions to accommodate a clutch structure presently described. The left section of the lever 40 also protrudes with an arm 40' downwardly and inwardly terminating in a bent portion 41' disposed for a length of its extremity at right angles to lever 40 and pointing toward device 10. A block and strip spring arrangement 46, similar to the springs 23 and blocks 24 for mounting the same, connects the inward flat side of portion or ear 41' with a left outside face 46' of the element 36'. A portion 40" below ear 41' accommodates another block and spring arrangement 45 at right angles to the above spring arrangement 46 and is fastened to a front face 45' of element 36'. This construction forms a lower pivot having a vertical axis at the intersection of the strip springs. A similar vertically aligned pivot is formed at the upper part of lever 40 by flaring out another ear 41 aligned with ear 41' to which is attached spring strip 44 anchored to the U-side element 36", and by anchoring at right angles to spring 44 another spring 43 attached to the top of lever 40 to element 36". Thus, it is seen that a frictionless pivoting axis or bearing Y—Y' is produced for lever 40.

Attached to the top right side of lever 40 are found two spaced sets of springs 47, 48 anchored in the manner already described for the previous spring strips. To the other ends of these springs 47, 48 are also fixed an armature base 60. An ear 42 is formed from the lever 40 between these springs to carry another strip spring 49 at right angles to the above springs 47 and 48. Attached to the rear end of the armature base 60 carrying armature 61 is a rear hinge spring strip 70, by means similar to block 24, the other end of flexible hinge 70 being adjustably mounted to the back portion of the U-shaped member 36 by a structure shown in Fig. 4 to be described later in connection with its function. This complete arrangement of spring mounting means for the lever 40 and the armature-carrying base 60 for armature 61 provides substantially parallel movement of armature 61 with respect to the pole faces 62" of the E-type transformer 62' when the lever 40 is disturbed about the axis Y—Y. Also the spring mounting means acts as means for centralizing said lever and for further preparing the lever to be acted upon by an absolute centering device described hereinafter. Therefore, the lever 40 including its spring mounting is characterized as a self-centering lever.

A clutch device 50 is formed of two paired substantially T-shaped elements 51, 51', one being placed on one side of the lever 40 at the left partially covering the cut-out portion of the same, and the other being placed on the opposite side of this lever, the elements 51, 51' being held together by a rivet 54. Elements 52, 52' form the base and gripping or jaw surfaces, respectively, of the T-shaped clutch 50. The clutch 50 is suspended from the upper part of the lever 40 by having two outwardly flared portions 55 and 55' to which is attached a set of strip springs 56 and 56' anchored to brackets 53 and 53' which are anchored to the lever 40. A coil spring 57 is anchored to the lower part of the clutch 50 and fastened to bottom part 33 of lever 40, whereby the contacting elements 52 and 52' are moved in the direction of a mating jaw 58 on the lever 40.

A clutch release bar 71 is mounted on two parallel vertical hinge spring supports 72 formed into a bracket-like base which is anchored by conventional means to the jog element 37' in the base of the structure 36 to provide parallel movement of release bar 71 between a lower inwardly protruding portion 73 of clutch 50 and an armature centering device 65 to be described hereinafter. Release bar 71 mounted on the spring hinges 72 is motivated through a lever 76 by either a spring 74 or a solenoid mechanism to which is attached link 77. Lever arm 76 is pivoted about a pivot 78' in a vertical pillar support 78 mounted rigidly on the base 11. A pin 79 on the left top of the release bar 71 rides in a slot 80 on one end of lever arm 76, the opposite end of said lever arm 76 being pivotally connected by common means 77' to the link 77, whose inner end is likewise pivoted to a plunger 80' of the solenoid 75 mounted rigid to the base 11 by bracket 75'. Midway between the pivot 78' and the pivot 77' is fastened the coil spring 74, the opposite end being connected to rigid members 85 and 38 fastened to the element 37 of the rigid upright support 36. A conventional energizable circuit 82, having a switch 83 therein, is connected to the input wires of solenoid 75.

In the present showing of the apparatus of this invention, the switch 83 is opened and hence solenoid 75 is deenergized and spring 74 is permitted to move the lever arm 76 counter-clockwise, thereby forcing release lever 71 to the left against the protruding portion 73 of the clutch 50. Since spring 74 is made to have stronger tensioning than clutch spring 57, it is seen that the jaws 52, 52' are moved away from the mating jaw 58 against the action of spring 57, thereby permitting a slightly flexible rod 9 which is connected to the pressure-responsive device 10 to be free of the clutch. Thus, it is seen that declutching means are provided for the clutch means. When the apparatus is in this condition, additional mechanism should respond to place the armature 61 in a position relative to the E-transformer 62' such that no output will be derived from the same.

Automatic armature centering device 65 is incorporated into the apparatus for this purpose. The rigid element 38, mentioned above very briefly in connection with the spring 74, is formed as an L-shaped member having a right-angle piece 39 at one end attached to the element 37 by conventional screw means. At the other end of element 38 is attached a rigid member 85 which, in turn, has anchored thereon a strip spring 66 fastened by block means described heretofore. On the other end of spring 66 is mounted a rigid member 86 carrying at its extreme end a cone-shaped structure 87 having a pilot 88 at the top of the cone which is adapted to ride within a centering slot 89 found on a bracket-like structure 90 formed at the lower right hand corner of lever 40, the plane of the slot being at right angles to the main body portion of the lever 40. Also, the rigid element 38 is so disposed that the spring 66 is at right angles to lever 40 and, therefore, the action of spring 66 is such as to force the cone 87 partially but snugly into the slot 89, which action will move the lever 40 about the axis Y—Y in one direction or the other depending upon the previous position of the armature before the solenoid 75 was deenergized. Hence, assuming that the armature 61 and E-transformer 62' of the pick-off device 62 have been previously positionally adjusted, it can be seen that the armature centering device 65 will always bring back the armature 61 to a position which will produce zero output from the pick-off 62.

Initial adjustment of the pick-off 62 is obtained with switch 83 open when the craft mounting the novel instrument is at ground level by loosening set screws 26 and 26' holding the E-transformer base 25 in place and then turning thumb-screw 25'' until zero output from the pick-off 62 is indicated on any conventional meter (not shown) connected in the transformer circuit. In the event that consistent zeroing of the armature 61 after each declutching action of the apparatus is unattainable, further adjustment means for the pick-off 62 is provided as shown in detail in Fig. 4, wherein a member 92 with an overhanging ledge 92' forming a flexible throat 93 is mounted at the back of rigid member 36 by a screw 94 to hold the long spring strip 70 which is retained between member 92 and a member 95 having a ledge 95' overhanging the throat 93 by ordinary rivet means. At the far end of this assembly an adjustment screw 96 is threaded through the same to make end contact with the outer back face of structure 36, whereby movement of strip 70 can be produced about the throat 93 as an axis. This adjusting means also effects the movement of armature 61 relative to the pole faces 62'' of the E-transformer 62'. An adjusting screw 97 in the ledge 95' and through strip 70 provides additional adjustment of the initial position of the armature 61 and aids in determining the characteristics of the pick-off output as desired. In this case, it is desired to have a linear output. The strip spring arrangement such as elements 47, 48 and 49 in a right-angle relationship overcomes the effects of certain forces of acceleration upon the armature 61 and its base 60.

Returning to the operation of the apparatus, it is seen that when the solenoid switch 83 is closed and the solenoid 75 is energized from circuit 82, the plunger 80' connected through link 77 to lever arm 76 turns the same clockwise about pivot 78' since the power generated by the solenoid acting through the mechanical advantage from pivot 78' to pivot 77' is stronger than spring 74, thereby forcing clutch release bar 71 away from the clutch 50, releasing the same for movement by spring 57 and moving the right end of the bar 71 toward the pilot 88 for contact thereto at its end a moment or at a time point slightly after the clutch jaws 52, 52' and 58 grip rod 9. This delayed contact between bar 71 and pilot 88 is accomplished by having an initial clearance between these two elements slightly greater than a one-way travel of clutch elements 52, 52'. The above relationship can also be adjustably maintained by the thumb-screw arrangement 71' on the left end of release bar 71. Thus, the pick-off 62 is held to a very small, if any, "jolt" or error of signal when the clutching means above engages and disengages the rod 9. Said rod is preferably made sufficiently slender so as to be transversely flexible or resilient to avoid interposing appreciable resistance to the rotation of lever or plate 40 about the axis Y—Y' which might otherwise be interposed through the gripping action of the jaws 52, 52' and 58 on the rod when the bellows 10 moves. Additional protection is given the apparatus by making the coil spring 57 sufficiently weak so that slippage of rod 9 through the clutch arms 52, 52' and 58 will occur if sudden and undesirable large displacements of the bellows 10 are encountered.

The mechanical advantage of the main lever 40 is made such that for a minimum change in the position of shaft 19 coupling the rod 9 to the pressure-responsive device 10 due to a change of a few feet in the elevation of the craft, the resulting change in the output of pick-off 62 will be sufficiently high to be utilized in a standard servo motor setup including an electric amplifier for an automatic pilot control system for aircraft.

Damping means 100, shown in detail in Fig. 3 and mounted from two points in the novel apparatus, one point being fixed as on the upper back of the rigid element 36 by a bracket 101, eliminates undesired output impulses or signals from pick-off 62 produced through a variety of causes. Damping device 100 can be considered a two-part device in that its essential elements comprise a highly magnetic piece such as a cylindrical Alnico pole 102 centered and fixed within an iron cylinder 103, in turn fixed to the bracket 101, and a copper cup-shaped element 105 fitted for movement substantially longitudinally within the cylinder 103 and about pole 102, the cup 105 being mounted on a bracket 106 which is fixed to the top part of lever 40 by rivets 106' on its least mechanical lever arm substantially in line with a vertical plane (not shown) within which rod 9 may be associated. In this manner, cup 105 is subjected to a minimum transverse motion. To increase the magnetic coupling between iron cylinder 103 and the Alnico pole 102, a shallow pole face 104 of a larger diameter than the pole 102 is press-fitted over the exposed end of the same. The above structure dampens the movement of the inherently self-centering lever 40 carrying pick-off element carrying means and other parts directly coupled to the same in a characteristic fashion well known to the electrical art.

Since, as explained in the general summary of the invention, the concept of employing frictionless apparatus in conjunction with pressure-responsive and pick-off devices is not limited for use in a situation demanding altitude control of aircraft through the application of mere static pressure to the pressure-responsive means, additional control of aircraft is shown in Fig. 5, demonstrating schematically how the structure of Fig. 1 may be altered for use in connection with altitude control, banking control or even speed control of aircraft using dynamic pressure as the additional power-generating source for the pick-off device. In this case, the described apparatus of Fig. 1 would be placed in a container 110 airtight except for openings therein permitting entrance of tubing 111 and 112. Tubing 112, forming the static pressure air line, leads directly to the interior of aneroid device 10 from an air accumulator 113 outside the aircraft, while tubing 111 forms the dynamic air line from the accumulator 113 to the immediate interior of the container 110. The signal generator and coupling apparatus labeled 115 is a block representation of the pick-off device 62 and coupling apparatus interposed between the same and the pressure-responsive device 10, respectively, the control circuit 82 of solenoid 75 being found outside the container 110, and this likewise holds true for output leads 116 from the pick-off.

The novelty of this invention from a broad viewpoint resides in the means of obtaining an output of appreciable magnitude from small sources of power through a mechanical system without the use of friction means connecting an input source to the output and hence the scope of the invention is not to be limited by the present embodiments of the same.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a device of the character described, the combination of motion input means, a rod-like element coupled at one end to said means, a lever coupled to the other end of said element, means for self-centralizing said lever, a pick-off producing an output and including a movable element connected to said lever and clutch means for coupling and uncoupling said rod-like element and said lever, said lever moving responsive to actuation by said input means to cause the output of said pick-off to change correspondingly.

2. In a device of the character described, the combination of a first pressure-responsive means, a transversely resilient element coupled at one end to said first means, a lever coupled to the other end of said element, means for centralizing said lever, and a pick-off including a movable element connected to said lever and producing an output, said lever moving responsive to actuation by said first means to cause the output of said pick-off to change correspondingly.

3. In a device of the character described, the combination of a first pressure-responsive means, a rod-like element coupled at one end to said first means, a self-centering lever coupled to the other end of said element, clutch means integral with said lever for coupling and uncoupling the same to the other end of said element, and a pick-off including a movable element connected to said lever whereby varying pressure changes on said first means are translated to said pick-off which produces a substantially linear output.

4. In a device of the character described, the combination of a first pressure-responsive means, a pick-off including a movable element, a pick-off element carrying means including a lever, spring mounting self-centering means for said lever, and means including a transversely flexible element responsive to said first means interposed between the same and said lever whereby varying pressure changes on said first means are transferred to said pick-off.

5. In a device of the character described, the combination of a first pressure-responsive means, a pick-off including a movable element, pick-off element carrying means including a lever, clutch means mounted on said lever, motivating means for said clutch means, and means including a transversely flexible element responsive to said first means interposed between the same and said clutch means, whereby increments of pressure changes on said first means effect substantially linear increments in the output of said pick-off.

6. In a device of the character described, the combination of a first pressure-responsive means, a pick-off including a movable element, clutch means, pick-off element carrying means including a lever between said pick-off and said clutch means, motivating means for said clutch means, and means including a flexible element responsive to said first means interposed between the same and said clutch means, and centralizing means coupled to said pick-off element carrying means whereby varying pressure changes on said first means produce substantial changes in the output of said pick-off, said clutch means including the motivating means facilitating a zero signal position for said movable element at any altitude below a predetermined level.

7. In a device of the character described, the combination of a first pressure-responsive means, an electric pick-off, armature carrying means including a lever, frictionless mounting means for said lever, and means including a transversely yielding elongated element responsive to said first means interposed between the same and said armature carrying means whereby varying pressure changes on said first means introduce substantial positional changes of said movable armature to effect corresponding output changes of said pick-off.

8. In a device of the character described, the combination of a first means, an electric pick-off device including a movable armature, clutch means, pick-off armature carrying means including a lever between said pick-off and said clutch means, said clutch means including pivoting means on said lever, motivating means for said clutch means, and means including a rod-like element responsive to said first means interposed between the same and said clutch means whereby varying pressure changes on said first means produce substantial changes in the output of said pick-off when said rod-like element is engaged by said clutch.

9. In a device of the character described, the combination of a first pressure-responsive means, an electric pick-off device including a movable armature, clutch means, pivoting means for said clutch means, pick-off armature carrying means including a lever between said pick-off device and said clutch means, activating means for said clutch means, means including a transversely flexible elongated element responsive to said first means interposed between the same and said clutch means, and means coupled to said armature carrying means for damping the movement of said movable element whereby varying pressure changes on said pressure-responsive device produce substantial changes in the output of said pick-off device without distracting energy inputs to said device being superposed on said pick-off changes.

10. In a device of the character described, the combination of a first pressure-responsive means, a pick-off including a movable element, paired clutch elements, pivoting means for said clutch elements, a pick-off carrying means including a lever between said pick-off and said clutch elements, activating means for said clutch elements, means including an elongated, transversely yielding element responsive to said first means interposed between the same and said clutch elements, and means for positively centering said movable element upon disconnection of said first means from said element carrying means, whereby varying pressure changes on said first means produce substantially linear changes in the output of said pick-off from a zero reference output point of the same corresponding to any pressure datum below a predetermined maximum.

11. In a device of the character described, the combination of a first pressure-responsive means, a pick-off including a movable element, clutch means, pivoting means for said clutch means, pick-off carrying means including a lever between said pick-off device and said clutch means, activating means for said clutch means, means responsive to said first means interposed between the same and said clutch means, means coupled to said element carrying means for damping the movement of said movable element, and means for zeroizing said pick-off upon disconnection of said first means from said element carrying means, whereby pressure changes on said first means institute amplified changes in the output of said pick-off.

12. In a device of the character described, the combination of a first motion input means, an electric pick-off including a movable armature, clutch means, pivoting means for said clutch means, pick-off armature carrying means including a spring mounted lever between said pick-off and said clutch means, activating means for said clutch means, means including a transversely flexible element responsive to said first means interposed between the same and said clutch means, and means for zeroizing said pick-off upon disconnection of said first means from said armature carrying means, said lever moving responsive to actuation by said input means to cause the output of said pick-off to change linearly upon engagement of said flexible element by said clutch means.

13. In a device of the character described, the combination of a first pressure-responsive means, an electric pick-off including a movable armature, clutch means including jaws, pick-off armature carrying means including a mechanical amplifying mechanism between said pick-off and said clutch means, said jaws being part of said mechanism, activating and deactivating means for said clutch means, means including a rod-like element responsive to said first means interposed between the same and said clutch means, means coupled to said armature carrying means for damping the movement of said movable armature, and means for positively centering said movable armature upon disconnection of said first means from said armature carrying means.

14. In a device used in an automatic height control system for aircraft, the combination comprising a barometric device, a pick-off including a movable element, a main lever, spring mounting means for said lever, spring means interposed between said movable element and said main lever, clutch means, pivoting means for said clutch means mounted on said main lever, means interposed between said clutch means and said barometric device, and activating means coupled to said clutch means whereby said barometric device may be used for causing impulses to be generated about a zero reference impulse point corresponding to any altitude below a predetermined maximum elevation.

15. In a device used in an automatic height control system for aircraft, the combination comprising a barometric device, a pick-off including a movable element, a main lever, spring mounting means for said lever, spring means interposed between said movable element and said main lever, clutch means, pivoting means for said clutch means mounted on said main lever, means interposed between said clutch means and said barometric device, and activating means for said clutch means, and a two part damping means, one part being mounted at a fixed point, the other part being mounted on the main lever whereby said barometric device may be used for causing a signal to be generated about a null reference point corresponding to any altitude below a predetermined maximum elevation.

16. In a device of the character described, the combination comprising a first pressure-responsive device, a pick-off including a movable element, a main lever, spring mounting means for said lever, means interposed between said first device and said main lever, clutch means, pivoting means for said clutch means mounted on said main lever, declutching means intermittently coupled to said clutch means, a two-part damping means, one part being mounted at a fixed point, the other part being mounted on the main lever, and centering means including a spring-mounted centering arm whereby said first device may be used for causing signals to be generated about a zero reference point at any altitude below a predetermined maximum elevation.

ALEXANDER W. MESTON.

REFERENCES CITED

The following references are of record in the file of this patent:

UNITED STATES PATENTS

| Number | Name | Date |
|---|---|---|
| 2,407,657 | Esval | Sept. 17, 1946 |
| 2,227,055 | Bishoff | Dec. 31, 1940 |